United States Patent

Curtis et al.

[11] Patent Number: 5,650,003
[45] Date of Patent: Jul. 22, 1997

[54] CATIONIZED PIGMENTS AND THEIR USE IN PAPERMAKING

[75] Inventors: Jerry Leon Curtis, Milledgeville; Lester William House, Macon, both of Ga.

[73] Assignee: Nord Naolin Company, Jeffersonville, Ga.

[21] Appl. No.: 573,660

[22] Filed: Dec. 18, 1995

[51] Int. Cl.$^6$ .............. C09C 3/10; C04B 14/10; C04B 14/36; D21H 17/68
[52] U.S. Cl. .............. 106/445; 106/446; 106/448; 106/487; 162/164.3; 162/164.6; 162/181.4; 162/181.5
[58] Field of Search .............. 106/445, 487, 106/446, 448; 162/164.3, 164.6, 181.4, 181.5

[56] References Cited

U.S. PATENT DOCUMENTS

| | | | |
|---|---|---|---|
| 3,594,212 | 7/1971 | Ditsch | 428/274 |
| 3,597,304 | 8/1971 | Baldwin et al. | 162/142 |
| 3,950,180 | 4/1976 | Kato | 106/468 |
| 4,022,735 | 5/1977 | Thompson | 502/211 |
| 4,109,049 | 8/1978 | Thompson | 503/209 |
| 4,162,348 | 7/1979 | Juzu et al. | 428/416 |
| 4,543,128 | 9/1985 | Troesch et al. | 106/230 |
| 4,585,640 | 4/1986 | Desmond et al. | 423/706 |
| 4,664,715 | 5/1987 | Jesse | 106/402 |
| 4,738,726 | 4/1988 | Pratt et al. | 106/487 |
| 4,755,229 | 7/1988 | Armanini | 106/413 |
| 4,767,466 | 8/1988 | Nemeh et al. | 106/487 |
| 4,818,294 | 4/1989 | Raythatha et al. | 106/487 |
| 4,874,466 | 10/1989 | Savino | 162/164.3 |
| 4,902,729 | 2/1990 | Wason | 523/212 |
| 5,006,574 | 4/1991 | Sennett et al. | 523/351 |
| 5,074,917 | 12/1991 | Persello | 106/436 |
| 5,078,793 | 1/1992 | Caton | 504/303 |
| 5,089,056 | 2/1992 | Shi et al. | 106/486 |
| 5,106,420 | 4/1992 | Marshall, Jr. et al. | 106/499 |
| 5,106,421 | 4/1992 | Marshall, Jr. et al. | 106/499 |
| 5,116,418 | 5/1992 | Kaliski | 106/415 |
| 5,120,365 | 6/1992 | Kogler | 106/415 |
| 5,152,835 | 10/1992 | Nemeh | 106/437 |
| 5,169,441 | 12/1992 | Lauzon | 106/416 |
| 5,178,730 | 1/1993 | Bixler et al. | 162/168.3 |
| 5,240,561 | 8/1993 | Kaliski | 162/138 |
| 5,279,663 | 1/1994 | Kaliski | 106/486 |
| 5,312,484 | 5/1994 | Kaliski | 106/446 |
| 5,336,311 | 8/1994 | Curtis et al. | 106/416 |
| 5,346,546 | 9/1994 | Kaliski | 106/436 |
| 5,378,399 | 1/1995 | Kaliski | 252/313.1 |
| 5,384,013 | 1/1995 | Husband et al. | 162/168.1 |
| 5,407,464 | 4/1995 | Kaliski | 75/746 |

FOREIGN PATENT DOCUMENTS

0491346A1  12/1991  European Pat. Off. .

Primary Examiner—Mark L. Bell
Assistant Examiner—David Sample
Attorney, Agent, or Firm—Darby & Darby

[57] ABSTRACT

A pigment composition containing titanium dioxide ($TiO_2$) and calcined clay in a weight ratio of between about 30:70 and 70:30, preferably between about 35:65 and 45:55 that is substantially free of a functional microgel component has advantages over a similar pigment containing a functional microgel. The pigment composition contains an amount of epichlorohydrin dimethylamine condensate that is sufficient to cationize the pigment, and lacks a microgel component. It is liquid when agitated. Preferably the composition has a solids content greater than about 55%, and most preferably between about 59% and about 61%.

32 Claims, No Drawings

CATIONIZED PIGMENTS AND THEIR USE IN PAPERMAKING

FIELD OF THE INVENTION

This invention relates to pigment compositions containing $TiO_2$ and calcined clay and their use in papermaking.

BACKGROUND OF THE INVENTION

Pigments are finely divided particulate solids which are typically either dispersed in vehicles or coated on a substrate. Pigments may be organic or inorganic, and are usually unaffected by the vehicle or medium in which they are incorporated. They may alter appearance by selective absorption or by scattering light, and are often used as an integral part of decorative, protective and functional coatings. In general pigments are insoluble, unlike dyes, which are soluble.

Pigment particles may vary in size, shape and surface area. In commercial applications, typical pigment particles are from 0.01–10.0 μm in diameter and from 1–1100 $m^2/g$ in surface area. To achieve complete dispersion in a vehicle, the surface of the pigment particles must be properly wetted.

Extender pigments are colorless or white and generally have a refractive index of less than 1.7. One example of an extender pigment is kaolin, a hydrous aluminosilicate mineral that is used as a filler in the paper and paperboard industry. Calcined kaolins are white and hard, and are used for example in paper and in water based paints. Additional extender pigments include other clays, calcium carbonates, talc (magnesium silicates), and titanium dioxide.

U.S. Pat. No. 5,116,418, hereby incorporated by reference, describes a type of pigment known as a "structured aggregate pigment". Such pigments can include aggregates of particulate matter treated with a "functional microgel component". One commercially sold structured aggregate pigment of this type is Norplex® 604, made by Nord Kaolin Company of Jeffersonville, Ga.

U.S. Pat. No. 5,336,311, hereby incorporated by reference, describes cationizing a structured aggregate pigment by adding a sufficient amount of a modified or unmodified condensation product of epichlorohydrin and dimethylamine. That patent discloses, for example, that a structured aggregate pigment, such as Norplex® 604, can be cationized with a suitable modified or unmodified condensation product of epichlorohydrin and dimethylamine. The commercially available pigment Norplex® 650 (Nord Kaolin) is made in this manner. The cationized structured aggregate pigment of U.S. Pat. No. 5,336,311 is disclosed to exhibit superior retention characteristics when used in papermaking.

Pigments made using cationic polymers are also described in U.S. Pat. Nos. 4,874,466; 5,169,441; 5,006,574; 5,152,835, 4,738,726, and 5,078,793.

Cationic pigments that are to be used for papermaking should have several properties if they are to be most useful. They should be efficiently transportable, particularly by railway car. Specifically, upon addition of cationic polymer the pigments should be capable of forming a reasonably high solids slurry. The pigments of U.S. Pat. No. 5,336,311 are said to be capable of forming a slurry of "a maximum of about 55% solids". This allows relatively efficient transport in a railway tank car. It would be advantageous, however, to form an even higher solids slurry to increase the efficiency of transport (i.e., to transport more pigment and less water). It would also be advantageous to use less cationizing agent to form the high solids slurry.

Furthermore, the pigments should advantageously form a gel when the cationic polymer is added to prevent settling of the pigment during transport. Such settling can make removal of the pigment from the railway car very difficult. It is preferred, however, that the gel not be too hard. The gel should be capable of forming a free flowing liquid when gently agitated, such as with a gentle air stream ("air sparging"). This allows the pigment to be drawn through lines attached to railway car.

In addition to these handling properties, the pigment should be sufficiently retained in a "filled" paper sheet in the papermaking process. Pigment that is not retained enters the waste stream of the papermaking plant, where it must either be recycled or properly treated as a pollutant. The structured aggregate pigment containing a functional microgel of U.S. Pat. No. 5,336,311 has especially advantageous retention characteristics.

There is a need for a pigment that exhibits improved handling characteristics and superior retention characteristics, but which does not employ a functional microgel component as in the structured aggregate pigments described above. There is also a need for a pigment that could, if desired, be formulated at a higher solids level for more efficient transport. In addition, there is a need for a pigment that requires less cationic polymer to make an adequately cationized slurry.

SUMMARY OF THE INVENTION

It has been found that by using titanium dioxide ($TiO_2$) and calcined clay in a weight ratio of between about 30:70 and 70:30, preferably between about 35:65 and 45:55, in a pigment composition that is substantially free of a functional microgel component, a pigment can be obtained that has advantages over a similar pigment containing a functional microgel. The pigment composition of the invention contains an amount of epichlorohydrin dimethylamine condensate that is sufficient to cationize the pigment, and lacks a microgel component. It is liquid when agitated. Preferably the composition has a solids content greater than about 55%, and most preferably between about 59% and about 61%.

In another embodiment, the invention relates to a method for forming a cationic pigment composition that is suitable for transport. The method involves forming a gel, preferably in a shipping vessel, of a cationic pigment composition that comprises $TiO_2$ and calcined clay in a weight ratio of between about 30:70 and 70:30, preferably between about 35:65 to 45:55. The cationic pigment composition contains an appropriate modified or unmodified epichlorohydrin dimethylamine condensate in an amount sufficient to cationize the pigment. The pigment composition substantially lacks a microgel component. The gel formed of the pigment composition is capable of being liquified upon agitation.

In a further embodiment, the invention relates to a method of using the cationized pigment composition in a papermaking process. The method involves agitating a gel of the cationic pigment composition to substantially liquify it. The pigment is then used in a papermaking process.

DETAILED DESCRIPTION OF THE INVENTION

Pigment compositions of the invention are capable, using a suitable epichlorohydrin dimethylamine condensate (Epi-DMA), of being made at higher solids levels than those obtainable with the structured aggregate pigments containing a functional microgel of the prior art. The pigment compositions of the invention also have advantageous handling characteristics that make them ideal for transport. The pigment compositions are capable of matching the superior retention characteristics in papermaking of the structured aggregate pigments of the prior art, without the need for a functional microgel component. In addition, the compositions often require less Epi-DMA to obtain an adequately cationized pigment than similar structured aggregate pigments containing a functional microgel. For convenience, the term "Epi-DMA" is used herein to refer to any suitable modified or unmodified condensation product of epichlorohydrin and dimethylamine, as well as derivatives or equivalents thereof.

For example, a 58% solids slurry can be obtained using a pigment that includes $TiO_2$ and calcined clay in a 40:60 proportion and an ammonia cross-linked Epi-DMA type polymer sold as Nalco® 8850 (Nalco Chemical Company, Oak Brook, Ill.) that gels and is capable of turning very fluid when gently agitated. Only 65 pounds of Nalco® 8850 per ton of dry pigment is required. The pigment exhibits superior retention characteristics. A similar pigment of the type described in U.S. Pat. No. 5,336,311 requires the addition of microgel components such as calcium chloride, sodium aluminate and sodium silicate. Furthermore, a 53% solids slurry requires 80 pounds of Nalco® 8850 per ton of dry pigment to form a properly cationized composition. In addition, if a solids content of about 58% is attempted, a very hard gel is formed that will not liquify when agitated.

The epichlorohydrin dimethylamine condensation products that can be used according to the invention include condensates of epichlorohydrin with dimethylamine or with dimethylamine substituted with cross-linking agents such as ammonia or a primary aliphatic amine.

Commercially available Epi-DMAs that are preferred for use in the invention include Nalco® TX 7991 (molecular weight of about 100,000) and Prochem™ 3100 (molecular weight of about 75,000), manufactured by Southern Water Consultants.

The monomer of the Epi-DMA in these products is

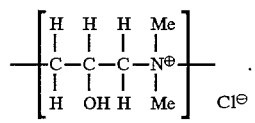

It will be understood by those skilled in the art that there are optimum molecular weight ranges for Epi-DMAs used in the present invention. If below or above the range, the Epi-DMA will not function properly. For example, Epi-DMA monomer (e.g., Quat™ 188, a 3-chloro 2-hydroxypropyl trimethyl ammonium chloride available from Dow Chemical Co.) has no effect on the $TiO_2$/calcined clay pigment blend of the present invention. Prochem™ 3100 LL, which has a low molecular weight, will result in a product that has the correct rheological properties but which does not retain properly in paper. Prochem™ 3100 L and Prochem™ 3100 have higher molecular weights and result in products that have the correct viscosity and retain well in paper. Epi-DMAs with even higher molecular weight, denoted Prochem 3100 H and Prochem 3100 HMW, fail because they result in products having a high viscosity.

One skilled in the art can readily determine whether an Epi-DMA of a particular molecular weight is suitable by testing as described in the Examples below.

As noted above, the pigment composition of the invention does not include a functional microgel component. Functional microgel components are described in U.S. Pat. Nos. 5,116,418 and 5,336,311. They are the product of a cross-linking reaction between an aqueous microgel setting agent and an aqueous hydrosol mixture of alkali-metal silicates (e.g. sodium silicate) and alkali-metal aluminates (e.g., sodium aluminate) or zincates. The microgel setting agent can be a bivalent inorganic salt (e.g., calcium chloride) and/or an organic cationically active compound with at least two reactive groups.

The cationic pigments according to the invention are made by combining the Epi-DMA with a slurry of pigments under turbulent conditions. The reaction time and temperature are not critical. For improved dispersion and for convenience, rapid addition of Epi-DMA at room temperature is preferred.

The Epi-DMA is used in relatively small amounts, typically 3 to 4 weight % of the total amount of pigment. Optimum amounts of the Epi-DMA can be determined by one skilled in the art by varying the amount used, and then measuring the handling and retention characteristics of the pigment obtained. Preferably the Epi-DMA is used in an amount of less than about 80 lbs. per ton of dry pigment, most preferably less than about 70 lbs. per ton of dry pigment Several methods may be used to form the pigment composition of the invention. All methods involve cationizing loose blends of $TiO_2$ and calcined clay. In one method, a slurry of calcined clay and water is cationized with the Epi-DMA condensate; a second slurry containing $TiO_2$ is then added to the cationized clay slurry to obtain a cationized $TiO_2$/clay slurry. Alternately, a slurry of $TiO_2$ can be blended with a slurry of calcined clay, and the resulting slurry cationized with Epi-DMA. It is also possible to blend dry $TiO_2$ with a slurry of calcined clay; the resulting slurry can then be cationized with the Epi-DMA. In addition, it is possible to cationize a slurry of $TiO_2$, and then mix the product with a slurry of calcined clay. The preferred method is to blend a $TiO_2$ slurry with calcined clay, and then add the Epi-DMA. This allows the ratio of $TiO_2$ and calcined clay to be adjusted prior to cationization, and avoids measurement and transport problems associated with dry materials. Variations on these methods will be apparent to one skilled in the art.

Preferably, the pH of the cationized slurry of $TiO_2$ and calcined clay is greater than about 6. The preferred range is from 7 to 8. The pH of titania slurry feed in particular may need to be selected to achieve the desired pH, since the pH of titania slurries varies depending on the additives that are included.

$TiO_2$ for use in the invention is commercially available from Kemira, Inc., SCM Metal Products, Inc., Tioxide Group PLC, and other manufacturers. Slurried $TiO_2$ is preferred, but one can use dry $TiO2$, if desired, to make pigment.

Suitable calcined clays for use in the invention include all paper grade calcined clays. An example is calcined kaolin, sold as Norcal® by Nord Kaolin Co. Hydrous kaolins do not have the necessary optical properties to function in the invention.

The preferred composition is formed of about 30 to 70% $TiO_2$ and about 30 to 70% calcined clay. Most preferably, the composition is formed of about 35 to 45% $TiO_2$ and about 55 to 65% calcined clay. This provides a superior combination of optical performance (when used as a filler in paper) and cost.

After the cationic pigment is made, it can be pumped into a railcar. Preferably the railcar is equipped with "airspargers" to liquify the material after it has gelled during shipment. After the pigment is sparged with air, it becomes fluid and can be pumped from the railcar to a storage container. After storage, it can be conventionally used in papermaking as a premium pigment. The cationic pigment of the invention allows papermakers to use less retention aid than when using an anionic pigment.

The invention is illustrated by the following examples. The examples are intended to exemplify the invention, not to limit its scope.

EXAMPLE 1

Preparation of High Solids Cationic Composite Pigment Using a Blend of Slurried $TiO_2$ and Slurried Calcined Clay Without Any Microgel Component.

The following is a description of a preferred method of making a pigment composition of the invention.

Five hundred twenty-four grams of 76.2% solids UDR™ 686 $TiO_2$ slurry (Kemira, Inc.) (containing 400 grams of $TiO_2$ on a dry weight basis) is added with mixing in a container with a high lift impeller at 100 RPM to 1,127 grams of 53.2% solids Norca® calcined clay slurry (Nord Kaolin Company). The resulting 60.5% solids loose blend of 60% calcined clay/40% $TiO_2$ is placed in a container and stirred with a high speed impeller at 400 RPM. 32.5 grams of Nalco® TX 7991 is rapidly added using a syringe to the stirring mixture. The resulting material flocculates and then liquifies very rapidly (generally in less than 30 seconds and almost always in less than 60 seconds).

EXAMPLE 2

Comparison of High Solids Pigment Compositions of the Invention With Structured Aggregate Pigment Compositions Including a Functional Microgel Component Pigment compositions were made of $TiO_2$/calcined clay in a ratio of 40:60. One set of pigment compositions was made from a loose blend of $TiO_2$ and calcined clay. The other set was made of structured aggregate pigments that included a microgel component. Each pigment was made at high levels of solids, and various cationic polymers tested. The pigments were made as follows.

The loose blend of 60% calcined clay/40% $TiO_2$ at 60.5% solids as described in Example 1, was used. A 56.5% solids loose blend was made by mixing 1,651 grams of the 60.5% solids loose blend with 119 grams of water.

A commercially available structured aggregate pigment composition including a functional microgel component was obtained containing 60% calcined clay/40% $TiO_2$ at 57.3% solids (Norplex® 604, Nord Kaolin Company).

The following procedures were followed to test the pigment compositions for their abilities to gel and then fluidize when agitated. 200 grams (measured on a dry weight basis) of either the 60.4% solid loose blend, the 57.3% Norplex®604 or the 56.5% loose blend was placed in a 600 ml stainless steel cup. A 3" impeller was put in the mixture and set at 400 RPM. Epi-DMA was rapidly added to the mixture from a syringe, and the resulting product mixed for one minute. If the resulting material did not fluidize, then the speed of the impeller was raised to 700 RPM and maintained for an additional minute. Generally, the amount of Epi-DMA was equivalent to 65 lbs. per dry ton of pigment. Higher amounts of Epi-DMA were added where a soft gel was not obtained with the lower amount.

The resulting material was stored in a sealed plastic cup and examined after 16 hours. At that time, a spatula was inserted into the material and the strength of the gel noted. Gels were characterized as "soft", "hard" or "very hard". A gel that was "very hard" was considered unsatisfactory, because an air sparger in a railway car would not be able to break it up.

The gel was then stirred with the spatula and the resulting material characterized. A characterization of "fluid" indicated that the material flowed like water. "Not fluid" indicated that the material did not become liquid under these conditions. A gel was considered satisfactory if it broke up to form a "fluid" material. "Fluid" materials allow gravity flow out of a rail tank car.

The results of this experiment are shown in Table I. "Solids" refers to the percent solids of the $TiO_2$/calcined clay feed. "Lbs./ton" refers to the number of pounds of polymer per ton of feed. "N-604" is the Norplex® 604 feed. "LB" refers to the loose blend feed (i.e., with no functional microgel).

TABLE I

Loose Blend Feed vs. Microgel Feed For Cationic Pigment

| Code | Feed | Solids | Polymer | lbs./ton | Gel | Fluidity | Usefulness |
| --- | --- | --- | --- | --- | --- | --- | --- |
| 1 | N-604 | 57.3 | Nalco ® 8850 | 90 | Very Hard | Not Fluid | Not Satisf. |
| 2 | N-604 | 57.3 | Nalco ® 8850 | 65 | Very Hard | Not Fluid | Not Satisf. |
| 3 | N-604 | 57.3 | Nalco ® TX 7991 | 65 | Soft | Fluid | Satisf. |
| 4 | LB | 56.5 | Nalco ® 8850 | 65 | Hard | Fluid | Satisf. |
| 5 | LB | 60.3 | Nalco ® 8850 | 65 | Very Hard | Not. Fluid | Not Satisf. |
| 6 | LB | 56.5 | Nalco ® TX 7991 | 65 | Soft | Fluid | Satisf. |
| 7 | LB | 60.3 | Nalco ® TX 7991 | 65 | Hard | Fluid | Satisf. |
| 8 | LB | 60.3 | Nalco ® TX 7991 | 71 | Soft | Fluid | Satisf. |

As can be seen in Table I, using Nalco®8850, a loose blend was cationized to yield a satisfactory product at 56.5% solids and 65 pounds per ton (See #4). Microgel containing feed, however, could not be made into a satisfactory product even at 90 pounds per ton (see #1 and #2). The loose blend could not be properly cationized to obtain a satisfactory product using Nalco®8850 at 60.3% and 65 pounds per ton (see #5). But the loose blend containing Nalco® TX 7991 worked well at 60.3% solids and 65 pounds per ton, and even better at 71 pounds per ton. A pigment formed with a microgel (i.e., N-604) could not be made at 60.3% solids for testing because it was not possible to obtain a calcined clay slurry with acceptable optical characteristics having the high solids required to make such a pigment.

Pigments made without functional microgel using other cationic polymers based on non EPi-DMA polymers, such as diallyldimethyl ammonium chloride condensates, were similarly tested. None were found to be satisfactory at 60.3% solids.

Table II shows the effect of molecular weight on pigment properties for a loose blend made as described in Example I using an Epi-DMA monomer or EPi-DMA polymers in the Prochem™ 3100 series.

TABLE II

Effect of Molecular Weight on Product Properties

| Product | Molecular Wt. | Results |
|---|---|---|
| Quat™ 188 | 188 | No gel |
| Prochem™ 3100 LL | 5,000 | Very light gel, not satisf. |
| Prochem™ 3100 L | 50,000 | Light gel, satisfactory |
| Prochem™ 3100 | 75,000 | Medium gel, satisfactory |
| Prochem™ 3100 H | 250,000 | Flocced system, not satisf. |

Tests were performed at 65 lbs. of Epi-DMA/ton of pigment at 57.3% solids.

Quat™ 188 (3-chloro,2-hydroxyproply trimethyl ammonium chloride, CAS #003327-22-8) is a monomer form of Epi-DMA. The Prochem™ polymers are sold by Southern Water Consultants.

For the Prochem™ 3100 series, a molecular weight of about 50,000 and above, but less than 250,000, was found to be satisfactory.

EXAMPLE 3

Comparison of Retention Characteristics of Pigment Made Using Loose Blend and Pigment Made Using Structured Aggregate Pigment Retention characteristics of pigment compositions made according to the invention were compared with those of a commercially available cationic structured aggregate pigment containing a functional microgel. The commercially available cationic structured aggregate pigment is known to exhibit superior retention characteristics compared with other available pigments.

Paper is normally made by diluting wood pulp with water (or "white water") to about 0.5% solids and adding chemicals and pigments to produce pulp furnish. In a commercial plant, the pulp furnish is poured onto a moving screen that allows most of the water, and some of the pigment and chemicals, to pass through. The screen retains almost all of the wood pulp and some of the pigments and chemicals. As the wood pulp dewaters, it becomes paper. The mixture of water, chemicals, and pigments that passes through the screen is collectively called "white water". The white water is continually recycled and used to dilute fresh wood pulp. Eventually, however, chemical build up in the white water requires that part of it be discharged into the waste treatment system and replaced with fresh water.

In a commercial plant, part of the pigment retained in the paper is from freshly added pigment and part is from recycled pigment in the white water. In the laboratory, pigment retention is measured based on retention after "the first time through a fixed mesh" (first pass retention), without considering any recycling.

A laboratory device that simulates a papermaking machine for measuring retention is called a "Britt jar". The Britt jar has a fixed mesh that retains pulp and part of the pigment, allowing white water to pass through. The white water is filtered through a tared filter paper that captures all of the pigment (and any traces of pulp in the white water). The difference between the weight of the filter paper (with the pigment) and the tare weight is the weight of the pigment.

Based on the percent solids of the furnish (termed "furnish consistency" or "$C_f$") and the percent solids of the white water (knows as "white water consistency" or "Cw"), one can calculate the percent First Pass Retention (FPR) by the formula:

$$FPR = \frac{(C_f - C_w)}{C_f} \times 100$$

The furnish is predominately formed of wood pulp. Traces of the wood pulp escaping into the white water can cause an inaccurate pigment retention measurement. Therefore, to obtain a more accurate measurement the filter paper from the Britt jar can be ashed in a 900° C. oven to burn away the organic material and leave only inorganic pigment. One then determines the "ash content" of the white water, or "Aw". Using filtration and ashing steps, one can also determine the "ash content" of the furnish, or "$A_f$".

The percent First Pass Ash Retention (FPAR) can be calculated using the formula:

$$FPAR = \frac{(C_f A_f - C_w A_w)}{C_f A_f} \times 100$$

The Percent First Pass Ash Retention is an indirect measure of the amount of pigment retained in paper.

It is also possible to take the pulp/pigment mixture retained on the mesh of the Britt jar, process it into paper, and directly measure the pigment retained in the paper. The optical properties of the paper can also be measured. While such direct retention measurement is more precise, it is much more time consuming and exacting. As a result, the normal procedure is to indirectly measure retention by the percent First Pass Retention (FPR) and percent First Pass Ash Retention (FPAR) methods.

Two basic mechanisms for retention have been recognized: absorption and filtration. Larger particles tend to be retained by filtration; the particles become enmeshed in and bound by the paper-making fibers during the manufacturing process. Smaller particles are retained by absorption. Factors affecting retention include the amount, particle size, shape and density of the fillers, the order in which different materials are introduced to the paper stock, and the ionic balance of the paper stock components. Retention is also affected by the conditions in the paper machinery and at the paper-forming wire. Temperature, pH, type of pulp fibers, sheet weight, wire mesh size, type of dewatering, degree of system closure, and machine speed can all affect pigment retention.

To evaluate the pigments of the invention, a representative papermaking stock was prepared, comprising 50% hardwood pulp and 50% softwood pulp. It had a consistency of 2.75% and Canadian Standard Freeness value of 385. The stock was made by diluting approximately 30 dry grams of pulp with 2000 ml of water and stirring. Ten dry grams of pigment was added and the mixture stirred for two minutes. Two ml of 10% alum (0.2 grams alum measured on a dry basis) was added to the mixture and stirred for five minutes and then diluted to a total volume of 8 liters. The pH of the resulting mixture was adjusted to 8.0±0.2, using 10% NaOH. The final pigmented stock was evaluated using a conventional Britt jar.

The Britt jar was furnished with a stirring motor set at 1000 RPM. The Britt jar has an inlet for adding papermaking materials, a wire mesh to trap pulp, and an outlet to allow white water to drain out. White water was processed as described above. Each step of the Britt jar test was controlled by a timer according to the following schedule (in seconds):

| Time | Event |
|---|---|
| 0 | Add 500 ml of Papermaking Stock |
| 20 | Start stirring motor |
| 25 | Add Retention Aid (Nalco 7533) |
| 30 | Open outlet and collect white water for 30 seconds |
| 60 | Stop motor, wash and dry jar for next run. |

The white water was weighed and vacuum filtered through a tared ashless filter paper. After drying in an oven at 110° F. for 10 minutes and cooling in a desiccator, the weight of the filter paper was determined. The filter paper was then ashed in a 900° C. oven for three hours, and the weight of the ash determined.

The retention results for pigments made without a microgel component using various Epi-DMA cationizing agents and for a commercially available structured aggregate pigment made with Nalco® 8850 as cationizing agent are shown in Table III. First pass retention (FPR) and first pass ash retention (FPAR) were evaluated using the standard Britt Jar retention procedure described above. The Epi-DMA cationizing agent was used in an amount that produced a product with satisfactory handling characteristics.

exceeding the superior retention characteristics of a commercially available structured aggregate pigment, but using less Epi-DMA and without the need for microgel components.

EXAMPLE 4

Evaluation of Optical Properties of Paper Made Using Pigment Of The Invention

Optical properties of paper made with pigment of the invention were evaluated and compared with paper made with pigment including a functional microgel component. The pigment of the invention was made as described in Example 1, using Epi-DMA commercially available as Nalco® TX 7991. The pigment containing the functional microgel component was made as described in Example 2 using 80 lbs. of Nalco 8850 per ton of pigment.

An alkaline papermaking process using pigment mixed with precipitated calcium carbonate (PCC), such as Albocar HO™ (Specialty Minerals) was simulated using a Britt jar. Results of the evaluation carried out on the Britt jar products are shown in Table IV. The total amount of filler used was held at 29.9% of the furnish solids. The balance of the furnish solids was comprised of pulp.

In Column I, results are shown where PCC was the only filler. When paper was made with PCC, and the PCC in the paper measured using X-ray fluorescence, it was found that

TABLE III

Effect of Different Polymers on Retention

Cationization of 60 Norcal ®/40 TiO₂ Loose Blend

| Percent Retention Aid (Nalco® 7533) Added | Sharp-floc™ 27 lbs./ton | Praes-tol™ 193K (20–30K) 63 lbs./ton | Praes-tol™ 193K (30K) 63 lbs./ton | Praes-tol™ 193K (50K) 63 lbs./ton | Pro-chem™ 3100 63 lbs./ton | Prochem™ 3100 L 63 lbs./ton | Nalco® 7991 63 lbs./ton | Nalco® 8850 75 lbs./ton | Cationization of Norplex® 604 |||
|---|---|---|---|---|---|---|---|---|---|---|---|
| | | | | | | | | | Nalco® 8850 94 lbs./ton | Nalco® 8850 111 lbs./ton | Nalco® 8850 111 lbs./ton |
| Percent First Pass Retention |||||||||||||
| 0.00 | 69 | 69 | 71 | 70 | 72 | 71 | 71 | 72 | 73 | 74 | 71 |
| 0.25 | 77 | 77 | 78 | 79 | 80 | 78 | 79 | 82 | 81 | 82 | 80 |
| 0.50 | 82 | 83 | 83 | 85 | 86 | 83 | 84 | 89 | 86 | 87 | 86 |
| Percent First Pass Ash Retention |||||||||||||
| 0.00 | 18 | 21 | 20 | 21 | 21 | 21 | 20 | 22 | 26 | 28 | 24 |
| 0.25 | 37 | 37 | 41 | 45 | 44 | 39 | 41 | 50 | 47 | 48 | 48 |
| 0.50 | 52 | 51 | 56 | 62 | 60 | 54 | 57 | 68 | 61 | 62 | 64 |

These results showed that pigment made without a microgel component (from a loose blend) that was cationized with only 75 lbs. of Nalco® 8850 per ton exhibited a slightly higher FPR than the structured aggregate pigment cationized with a higher amount (94–111 lbs.) of the same agent per ton. The pigment without microgel also exhibited a higher FPAR.

Pigment without microgel that was cationized with 63 lbs. per ton of Epi-DMAs Prochem™ 3100, Nalco® TX 7991, or Praestol™ 193K (50K molecular weight) exhibited about the same FRP and FPAR as the structured aggregate pigment made using 94–111 lbs of Nalco® 8850.

Epi-DMAs Sharpfloc™ 27, Praestol™ 193K (20–30K molecular weight), Praestol™ 193K (30K molecular weight), and Prochem™ 3100L resulted in a pigment without microgel that exhibited somewhat lower FPR and FPAR compared to the structured microgel pigment.

Therefore, appropriate pigment compositions made without a functional microgel were capable of matching or 15 parts of the original 29.9 parts (or 50.2%) of the PCC was retained in the paper (Column I).

Column II ("7.8 parts LB Pigment") shows results where 7.8 parts of the PCC was replaced with the pigment composition of this invention, leaving a balance of 22.1 parts PCC. The total filler in the furnish was kept at 29.9 parts. When PCC and the pigment of the invention were measured in the paper using X-ray fluorescence, 5.6 parts of the pigment, and 13.6 parts of the PCC were retained. The amount of pigment of the invention retained was 71.9% (i.e., 5.6/7.8). The amount of PCC retained was 61.6%. Not only was the pigment of the invention retained very well, but it also improved PCC retention (as compared with paper made with PCC alone).

Column III ("7.8 parts N-604 Pigment") shows results where 7.8 parts of the PCC was replaced with the cationic pigment containing functional microgel (i.e., U.S. Pat. No. 5,336,311 type pigment). The paper made using 7.8 parts pigment of the invention (column II) showed slightly better PCC retention compared with paper made with the same amount of pigment containing microgel (column III). The optical properties of the papers were very close to each other.

Column IV shows results for paper made with 11.7 parts of pigment of the invention. Column V shows results for paper made with 11.7 parts of pigment containing a functional microgel. In comparing Column IV with Column V, the product of this invention again resulted in a slight improvement in retention of PCC as compared with structured aggregate based cationic pigment (i.e., pigment containing a functional microgel).

Thus, at 7.8 parts and at 11.7 parts, the product of this invention was retained at least as well as, and perhaps better than, the cationic pigment containing a functional microgel.

Brightness measurements were taken according to TAPPI (Technical Association of the Pulp and Paper Industries) Standard T452 OM-87. Opacity was measured according to TAPPI Standard T425 OM-86. Hunter L-a-b was measured according to TAPPI T524 OM-86. The results obtained showed that optical properties were not adversely affected using the pigment of the invention as compared with pigment containing a functional microgel.

TABLE IV

| Property | I<br>PCC<br>Only | II<br>7.8<br>Parts LB<br>Pigment | III<br>7.8 Parts<br>N-604<br>Pigment | IV<br>11.7<br>Parts LB<br>Pigment | V 11.7<br>Parts<br>N-604<br>Pigment |
|---|---|---|---|---|---|
| Amount of Filler | | | | | |
| Parts Pigment | 0.0 | 7.8 | 7.8 | 11.7 | 11.7 |
| Parts PCC | 29.9 | 22.1 | 22.1 | 18.2 | 18.2 |
| TOTAL Parts Retained Filler | 29.9 | 29.9 | 29.9 | 29.9 | 29.9 |
| Pigment | 0.0 | 5.6 | 5.6 | 8.5 | 8.6 |
| PCC | 15.0 | 13.6 | 13.3 | 11.3 | 11.2 |
| TOTAL Total % Filler Retained | 15.0 | 19.2 | 18.9 | 19.8 | 19.8 |
| Pigment | 0.0 | 71.9 | 71.9 | 72.7 | 73.6 |
| PCC | 50.2 | 61.6 | 60.2 | 62.2 | 61.6 |
| TOTAL | 50.2 | 64.3 | 63.3 | 66.3 | 66.3 |
| TAPPI Brightness | 88.4 | 89.0 | 89.3 | 89.2 | 88.9 |
| TAPPI Opacity | 89.1 | 92.1 | 91.9 | 92.6 | 92.7 |
| Hunter: | | | | | |
| L | 95.7 | 95.97 | 95.94 | 96.05 | 96.06 |
| a | −0.1 | −0.23 | −0.20 | −0.27 | −0.26 |
| b | 2.73 | 2.65 | 2.69 | 2.66 | 2.63 |
| Base Paper Wt. (lbs./3300 ft²) | 50.0 | 50.0 | 50.0 | 50.0 | 50.0 |

What is claimed is:

1. An aqueous cationic pigment composition comprising $TiO_2$ and calcined clay in a weight ratio of between about 30:70 and 70:30, said pigment composition further comprising a modified or unmodified epichlorohydrin dimethylamine condensate in an amount sufficient to cationize said pigment, said pigment composition lacking a microgel component, and said composition begin liquid when sufficiently agitated.

2. The pigment composition according to claim 1 having a solids content greater than about 55%.

3. The pigment composition according to claim 1 having a solids content of between about 59% and about 61%.

4. The pigment composition according to claim 1 having a pH greater than about 6.

5. The pigment composition according to claim 1 having a pH of between about 7 and 8.

6. The pigment composition according to claim 1, wherein the epichlorohydrin dimethylamine condensate is an ammonia cross-linked epichlorohydrin dimethylamine condensate.

7. The pigment composition according to claim 1 comprising between about 35–45% titanium dioxide and 55–65% calcined clay.

8. The pigment composition according to claim 1 comprising 40% titanium dioxide and 60% calcined clay.

9. The pigment composition according to claim 1 wherein said epichlorohydrin dimethylamine condensate is in an amount of less than about 80 lbs. per ton of dry pigment.

10. The pigment composition according to claim 1 wherein said epichlorohydrin dimethylamine condensate is in an amount less than about 70 lbs. per ton of dry pigment.

11. The pigment composition according to claim 1, wherein the epichlorohydrin dimethylamine condensate includes a monomer component of the formula

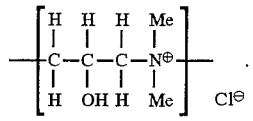

12. A method for forming a gelled cationic pigment composition that is suitable for transport comprising forming a gel of an aqueous cationic pigment composition, said aqueous pigment composition comprising $TiO_2$ and calcined clay in a weight ratio of $TiO_2$ and calcined clay of between about 30:70 and 70:30, said aqueous cationic pigment composition further comprising an appropriate modified or unmodified epichlorohydrin dimethylamine condensate in an mount sufficient to cationize said aqueous cationic pigment composition, said aqueous cationic pigment composition lacking a microgel component, wherein said gelled cationic pigment composition is capable of being fluidized upon agitation.

13. The method according to claim 12 wherein the solids content of said gelled cationic pigment composition is greater than about 55%.

14. The method according to claim 13 wherein the solids content of said gelled cationic pigment composition is between about 59% and 61%.

15. The method according to claim 12, wherein the epichlorohydrin condensate is added with mixing in an amount less than about 80 lbs. per ton of non-aqueous pigment contained in said aqueous cationic pigment composition.

16. The method according to claim 12, wherein the epichlorohydrin condensate is added with mixing in an amount less than about 70 lbs. per ton of non-aqueous pigment contained in said aqueous cationic pigment composition.

17. The method according to claim 12 wherein said gel is formed at a pH greater than about 6.

18. The method according to claim 17 wherein said gel is formed at a pH of between about 7 and 8.

19. The method according to claim 12 wherein the epichlorohydrin dimethylamine condensate has the monomer formula

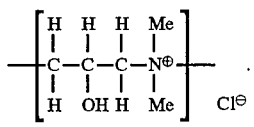

20. The method of claim 12 wherein said gel is formed in a shipping vessel.

21. The method of claim 20 further wherein said gel is agitated in said shipping vessel in order to liquify said gel.

22. A method of using an aqueous cationized pigment composition in a papermaking process, said method comprising (a) agitating a gel of said aqueous cationized pigment composition to substantially liquify it, said pigment composition comprising $TiO_2$ and calcined clay in a weight ratio of $TiO_2$ and calcined clay of between about 30:70 and 70:30, said cationic pigment composition further comprising an appropriate modified or unmodified epichlorohydrin dimethylamine condensate in an mount sufficient to cationize said pigment composition, said pigment composition lacking a microgel component; and (b) employing said pigment composition in a papermaking process.

23. The method according to claim 22 wherein said pigment exhibits more than about 70% first pass retention in said papermaking process.

24. The method according to claim 22 wherein said gel has a solids content of between about 55% and 61%.

25. The method according to claim 22 wherein said gel has a solids content of between about 59% and 61%.

26. The method according to claim 22 wherein said epichlorohydrin dimethylamine condensate is an ammonia cross-linked epichlorohydrin dimethylamine condensate.

27. The method according to claim 22 wherein said gel is agitated in a shipping vessel.

28. The method according to claim 22 wherein said gel is at a pH greater than about 6.

29. The method according to claim 22 wherein said gel is at a pH of between about 7 and 8.

30. The method according to claim 22 wherein said pigment exhibits more than about 50% first pass ash retention in said papermaking process.

31. The method according to claim 22 wherein said pigment exhibits more than 50% first pass ash retention.

32. The method according to claim 22 wherein said pigment is mixed with precipitated calcium carbonate.

* * * * *